Nov. 1, 1960

C. CHIMENTO 2,958,506

TURBINE MUFFLER

Filed Aug. 7, 1958

INVENTOR.
CHARLES CHIMENTO.
BY
Lockwood, Galt, Woodard & Smith
ATTORNEYS.

United States Patent Office 2,958,506
Patented Nov. 1, 1960

2,958,506

TURBINE MUFFLER

Charles Chimento, Indianapolis, Ind., assignor to Silencer Manufacturing, Inc., Indianapolis, Ind., a corporation of Indiana Filed Aug. 7, 1958, Ser. No. 753,728

6 Claims. (Cl. 253—52)

This invention relates generally to turbines and more particularly to a turbine structure adapted for use in muffling an internal combustion engine.

Conventional mufflers used on the engines of motor vehicles or the like have, as is well known, a limited service life. A further difficulty with conventional mufflers, because of their construction, involves the appreciable increase in engine back pressure which, of course, has a penalizing effect on the horsepower output of the engine. It is thus highly desirable to provide an apparatus which will dissipate the energy of the engine exhaust gases, thus muffling the engine, but which provides a minimum increase in the engine back pressure.

The apparatus of the present invention utilizes a turbine having a free vortex type housing and a bladed rotor whose rotation serves to dissipate the energy of the engine exhaust gases. The speed of the turbine is controlled so as to be maintained relatively constant for all engine speeds, this control of the turbine speed functioning on the inlet or hot side of the turbine.

A principal object of the present invention is to provide a turbine adapted to dissipate the energy of the exhaust gases from an internal combustion engine, thereby muffling the engine.

A further object of the present invention is to provide a muffling device for an internal combination engine which permits the engine to operate with a reduced back pressure as compared to a conventional muffler equipped engine.

A further object of the present invention is to provide a turbine of the type referred to above having means at its inlet side for controlling the turbine speed.

A further object of the present invention is to provide a turbine of the radial inflow type having a free vortex which is movable to change the mean radius of the angular motion of the gases through the vortex thereby varying the speed of the turbine rotor.

A further object of the present invention is to provide a muffling turbine for dissipating the energy of gases from a source such as the exhaust of an internal combustion engine wherein the turbine speed is maintained at a relatively constant value independently of variations in pressure and temperature of the entering gases over a normal range, said relatively constant speed being such as to provide the desired muffling effect without imposing dangerous stresses on the turbine rotor.

These and other objects will become apparent as the description proceeds with reference to the accompanying drawings in which.

Figure 2:
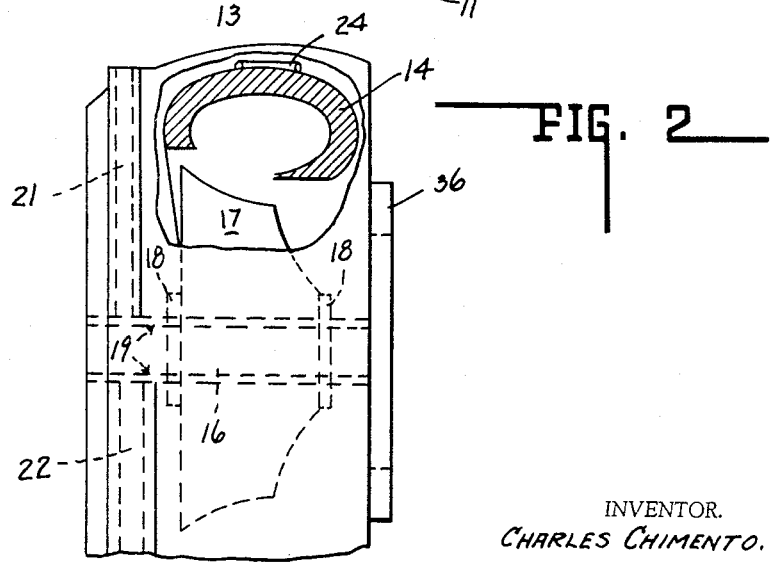
Fig. 2 is a side view, partially in section, showing a portion of the turbine of Fig. 1.

Referring to the drawings, there is shown generally at 10 a turbine housing of the free vortex type having an inlet flange 11 provided with threaded apertures 12 and thereby adapted for mounting on the exhaust manifold of an internal combustion engine. The housing is formed of a castable, high nickel content metal. In casting the housing, the housing is cored so as to provide an inlet opening 13 and a vortex tube 14 having a generally circular configuration which communicates with the inlet opening. As may be seen in Fig. 2, the vortex tube is open on its inner side to allow the exit of gases therefrom. The word "tube" is thus herein used in a special sense as describing the member 14 which has a slot along its length and tapers to a closed end.

Extending centrally through the housing and journaled therein is a turbine rotor shaft 16, which supports turbine blades 17. The blades are retained on the shaft by means of thrust plates 18, and the shaft is provided with conventional oil passages indicated generally at 19 in Fig. 2. A radial passage 21 in the housing communicates with the passages 19 and is adapted to have connected thereto a line leading from the conventional pressurized oil circulating system of the engine. A passage 22 in the housing, communciating with the passages 19, serves to return the oil, after it has performed its turbine bearing lubricating function, to the engine.

Figure 1:
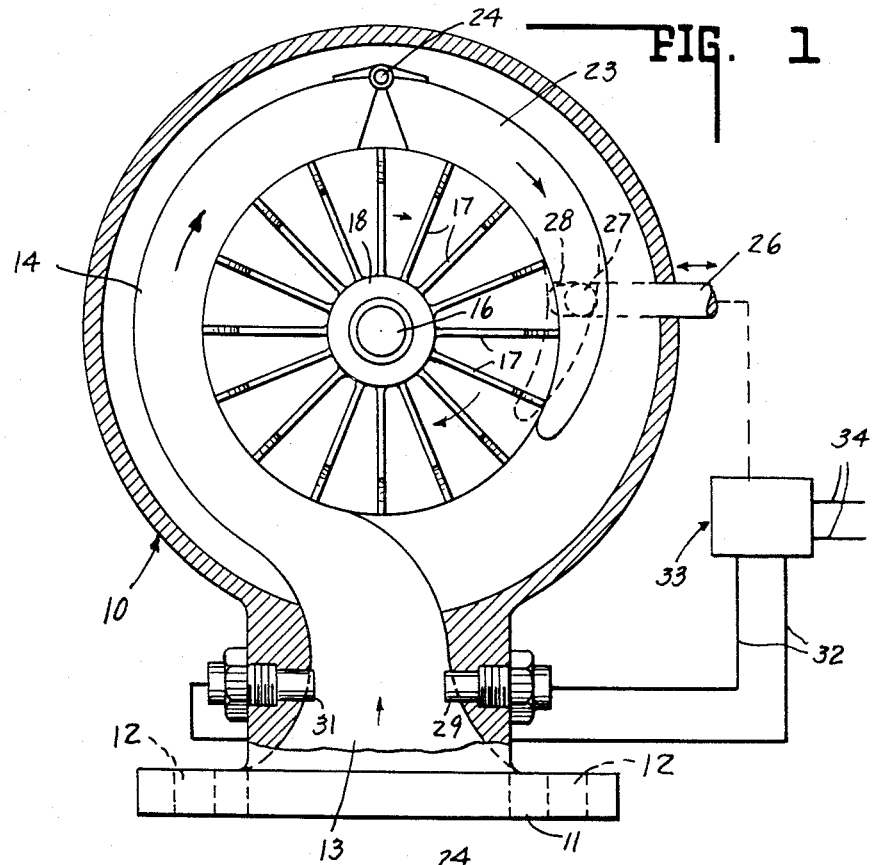
Fig. 1 is a side view, partially in section of a turbine embodying the present invention, portions of the control means being shown in schematic form.

As may be seen in Fig. 1, the terminal segment 23 of the vortex tube is hinged at 24 to the adjoining tube segment, the adjacent side sections of the tube segments being cut away to permit the terminal segment 23 to be pivotally moved toward and away from the axis of rotation of the turbine rotor. The means for displacing the terminal segment 23 includes a control arm 26 which extends along the rear face of the housing and is pivotally connected to a pin 27 extending rearwardly from the terminal segment 23. The pin extends through an elongated aperture 28 in the rear face of the housing, the control arm being thereby free to move to position the terminal segment of the vortex tube between its solid and broken line positions of Fig. 1.

The position of the control arm and therefore the position of segment 23 is established as a function of the pressure and temperature of the engine exhaust gases entering the turbine. The means for positioning the control arm as a function of exhaust gas pressure and temperature may take any suitable conventional form. Since the positioning motor or actuating device per se does not form a part of the present invention, it is disclosed only schematically herein.

The housing may be provided with tapped apertures which accommodate the pressure sensing means 29 and the temperature sensing means 31, these being connected by means of suitable wiring 32 to a modulating control indicated schematically at 33. The pressure and temperature sensing means are of conventional type and may take the form of a standard S.A.E. pressure sensing probe and a standard S.A.E. high temperature thermocouple as listed in S.A.E. Engineering Specifications. Electrical power input to the control 33 may be supplied by wires 34 which may be connected to the conventional 12-volt motor vehicle electrical system. It will be understood that other forms of actuators for the control arm might be utilized, it being important as far as the present invention is concerned only that the control arm be positioned as a direct function of the temperature and pressure of the engine exhaust gases entering the turbine.

Control of the turbine rotor speed by the positioning of the terminal segment of the vortex tube may be explained by referring to the vortex theory of gas flow. This theory postulates that in the discharge of gas through annular nozzles the flow from such nozzles tends to be in the form of a "free vortex" in which the annular velocity of whirl varies inversely as the square of the radius from the center. Thus as the terminal segment of the vortex tube is removed from its solid line position of Fig. 1 toward its broken line position, that is, toward the axis of rotation of the turbine rotor, the speed of movement of the gases and consequently the speed of rotation of the turbine rotor will increase exponentially with relation to the movement of the vortex tube segment. Thus, in its maximum open position, shown in solid lines in Fig. 1, the turbine speed will be at its lowest value, and at its furtherest inward or closed position the speed of the turbine will be at a maximum.

In operation, the turbine inlet may be connected to the exhaust manifold of an internal combustion engine, and the exhaust flange 36 (Fig. 2) may be connected to a suitably formed exhaust pipe or conduit. The engine exhaust gases pass through the vortex tube and are delivered to the blades of the turbine rotor, causing it to rotate as indicated in Fig. 1. Upon initial starting of the engine the exhaust gas pressure and temperature are at minimum values and the segment 23 of the vortex tube is positioned by the control arm in its maximum closed position. As the engine speed is increased, the control arm is moved so as to position the segment 23 further toward its open position. The effect is thus to maintain the speed of the turbine relatively constant and independent of changes in engine speed. Rotation of the rotor serves to chop or segregate the exhaust gases into minute increments. The energy of the exhaust gases is thus spent, thereby providing the engine muffling effect.

The turbine type muffler thus provided by the present invention results in a considerable decrease in the engine back pressure as compared to a conventional muffler equipped engine. This relative decrease in back pressure increases the scavenging differential across the engine providing increased horsepower and longer engine life. Since the output of the turbine rotor is unused, the efficiency of the turbine is not particularly important and flat turbine blading may be used thus tending to eliminate high-frequency whine of the turbine.

While the invention has been disclosed and described in the drawings and foregoing description, they are to be considered as illustrative and not restrictive in character as other modifications may readily suggested themselves to persons skilled in this art and within the broad scope of the invention, reference being had to the appended claims.

The invention claimed is:

1. A muffling turbine adapted to dissipate the energy of high pressure gases comprising, a housing having an inlet opening and an outlet opening therein, a vortex tube within said housing and communicating with said inlet opening, a bladed rotor mounted for rotation within said housing adjacent said vortex tube, said vortex tube being shaped to generally follow the circular contour of said rotor and being adapted to direct gases thereagainst to rotate said rotor, the terminal segment of said vortex tube being pivotally supported and movable toward and away from the rotational axis of said rotor, and means responsive to the temperature and pressure of the gases entering said turbine connected to said terminal segment for positioning said terminal segment to maintain the speed of said rotor substantially constant, the energy of the gases being spent by rotation of said turbine rotor.

2. A muffling turbine adapted to dissipate the energy of high pressure gases comprising, a housing having an inlet opening and an outlet opening therein, a vortex tube within said housing and communicating with said inlet opening, a rotor mounted for rotation within said housing adjacent said vortex tube, said vortex tube being shaped to generally follow the circular contour of said rotor and being adapted to direct gases thereagainst to rotate said rotor, the terminal segment of said vortex tube being pivotally supported and movable toward and away from the rotational axis of said rotor, and means connected to said terminal segment for positioning said terminal segment to maintain the speed of said rotor substantially constant, the energy of the gases being spent by rotation of said turbine rotor.

3. A muffling turbine adapted to dissipate the energy of high pressure gases comprising, a housing having an inlet opening and an outlet opening therein, a vortex tube within said housing and communicating with said inlet opening, a rotor mounted for rotation within said housing, said vortex tube being adapted to direct gases thereagainst to rotate said rotor, the terminal segment of said vortex tube being pivotally supported and movable toward and away from the rotational axis of said rotor, and means responsive to the temperature and pressure of the gases entering said turbine connected to said terminal segment for positioning said terminal segment to maintain the speed of said rotor substantially constant, the energy of the gases being spent by rotation of said turbine rotor.

4. A turbine comprising, a housing having an inlet opening adapted to receive gases having substantial kinetic energy and an outlet opening for discharging spent gases, a vortex tube within said housing and communicating with said inlet opening, a rotor mounted for rotation within said housing adjacent said vortex tube, said vortex tube being shaped to generally follow the circular contour of said rotor and being adapted to direct gases thereagainst to rotate said rotor, the terminal segment of said vortex tube being pivotally supported and movable toward and away from the rotational axis of said rotor, and means connected to said terminal segment for positioning said terminal segment to control the speed of said rotor.

5. A turbine comprising, a housing having an inlet opening adapted to receive gases having substantial kinetic energy and an outlet opening for discharging spent gases, a vortex tube within said housing and communicating with said inlet opening, a rotor mounted for rotation within said housing, said vortex tube being adapted to direct engine exhaust gases thereagainst to rotate said rotor, the terminal segment of said vortex tube being pivotally supported and movable toward and away from the rotational axis of said rotor, and means connected to said terminal segment for positioning said terminal segment to control the speed of said rotor.

6. A turbine comprising, a housing having an inlet opening adapted to receive gases having substantial kinetic energy and an outlet opening for discharging spent gases, a vortex tube within said housing and communicating with said inlet opening, a rotor mounted for rotation within said housing, said vortex tube being adapted to direct gases thereagainst to rotate said rotor, the terminal segment of said vortex tube being pivotally supported and movable toward and away from the rotational axis of said rotor, and means connected to said terminal segment for positioning said terminal segment to control the speed of said rotor.

References Cited in the file of this patent

UNITED STATES PATENTS

| 701,531 | Bangs | June 3, 1902 |
| 1,551,337 | Siegler | Aug. 25, 1925 |
| 2,518,869 | Corless | Aug. 15, 1950 |
| 2,739,782 | White | Mar. 27, 1956 |
| 2,786,261 | Schalyo | Mar. 26, 1957 |
| 2,818,132 | Speck | Dec. 31, 1957 |

FOREIGN PATENTS

| 233,064 | Germany | Mar. 28, 1911 |
| 895,279 | Germany | Nov. 2, 1953 |